Patented Oct. 1, 1946

2,408,492

UNITED STATES PATENT OFFICE 2,408,492

MANUFACTURE OF SULPHAMIC ACID

Ernest J. Tauch, Cleveland Heights, Ohio, assignor to E. I. du Pont de Nemours & Company, Wilmington, Del., a corporation of Delaware No Drawing. Application January 8, 1943, Serial No. 471,743

8 Claims. (Cl. 23—166)

This invention relates to the manfacture of sulphamic acid and is directed to processes in which urea, sulphuric acid and sulphur trioxide are brought together in the proportions which on subsequent conversion to sulphamic acid give a dry product and converted to sulphamic acid in the presence of a solid pulverulent diluent under conditions that no substantial continuous body of liquid is present during the conversion, and more particularly to processes in which the reagents are brought together in the stated proportions and converted to sulphamic acid by heating while the reaction component is kept dispersed in or on the surface of a solid pulverulent diluent.

This application is in part a continuation of my copending application Serial No. 356,359 filed September 11, 1940, and incorporates herein by reference all the subject matter of that application and contains subject matter in common with my copending application Serial No. 356,358 filed September 11, 1940.

Prior to these applications the art had not known how to produce sulphamic acid from urea, sulphuric acid and sulphur trioxide directly as a dry free-flowing product and had not conceived it possible to do so. Rather, the art has heretofore found it necessary to produce sulphamic acid from these products by the so-called wet process in which the sulphamic acid is produced as a slurry in sulphuric acid. Said processes are subject to a great many difficuties some of which arise in filtration, centrifuging or settling, others of which in corrosion problems brought about by the many different strengths of sulphuric acid involved, still others in the decomposition of the sulphamic acid brought about by the heat generated in diluting sulphuric acid in washing the crystals of sulphamic acid, and still others of which appear as limitations on throughput.

Now I have found that sulphamic acid can be produced directly as a dry pulverulent product without being subject to any of these difficulties by bringing together the urea, sulphuric acid and sulphur trioxide in the proportions which on subsequent conversion to sulphamic acid gives a dry product and converting to sulphamic acid in the presence of a solid pulverulent diluent under conditions such that no substantial continuous body of liquid is present during the reaction and preferably by heating while the reaction component is kept in a dispersed condition in or on the surface of a solid pulverulent diluent.

In the processes of my invention numerous advantages from an operating standpoint are realized and remarkable economies are achieved. Thus the product is produced directly as a dry, free-flowing mass; the proceses are excellently suited to be used as continuous rather than intermittent for batch operations, and for this reason the economic advantages arising from continuous operation can be realized. The disadvantages pointed out above are avoided and greater throughput is possible. Whether the processes are used as continuous, intermittent or batch operations they have the further advantage of being free of danger of the reaction proceeding at an uncontrollable rate by maintaining the liquid component of the sulphamic acid-forming reaction dispersed in or upon the surface of a solid pulverulent diluent whereby no continuous body of liquid is present during the sulphamic acid-forming reaction, barriers are imposed to the self-propagation of the reaction, greater surface area is provided for the liberation of the gaseous product of the reaction, and more complete and uniform temperature control can be effected.

In carrying out the processes of my invention the reactants may be brought together in a variety of ways and the method of effecting the dispersion may be varied as may be best suited to any particular way. The sulphur trioxide and sulphuric acid may be added together as oleum of various strengths or separately as gaseous or liquid sulphur trioxide and concentrated sulphuric acid. Urea may be added in crystalline form or it may be fused and thus introduced into the reaction zone. The liquid sulphuric acid-containing component may be added to the urea slowly and in a manner such that dispersion of the liquid upon the surface of the urea as films or droplets is effected. The urea may be dissolved in or reacted with the sulphuric acid and the resulting product brought in contact with oleum of suitable strength. Similarly urea and sulphur trioxide might be pre-reacted and brought in contact with sulphuric acid. One particularly attractive method involves premixing of all three reactants under suitable controlled conditions to give an intermediate product of liquid form, as is taught in the co-assigned application Ser. No. 509,276, and thereafter effecting the sulphamic acid-forming reaction while the product is in a suitably dispersed state. Whatever the particular manner of bringing together the reactants the particular mode should be selected with the view of dispersing the reaction component of the sulphamic acid-forming reaction in or upon the surface of a solid pulverulent diluent whereby no substantial continuous body of liquid is present during that reaction and the reaction is effected with the reaction component dispersed upon the surface of a solid pulverulent diluent.

The condition that substantially no continuous body of liquid be present is to be understood to mean that any liquid component which is present exists in a substantially dispersed condition. The liquid component referred to might be, for instance, sulphuric acid, oleum, or a solution or slurry of the reactants or reaction products or intermediate products in the sulphuric acid or oleum, or a premix intermediate reaction product, the latter product being a liquid component which may be prepared according to the teachings of the co-assigned application Ser. No. 509,276. The presence of a substantially continuous body of liquid due to such liquid components may be avoided by effecting dispersion of the liquid into such forms as small droplets or films. It is observed that films do not constitute a continuous body of liquid because they are substantially discontinuous in one dimension. The reaction component is to be understood to mean that part of the mass in which the sulphamic acid-forming reaction takes place. It is that part which is converted to sulphamic acid in the reaction. It is inherently liquid but in the processes of my invention rapidly dries up as sulphamic acid is formed. The reaction mass as distinguished from the reaction component may be apparently dry because of the dispersion of the reaction component (liquid) on the surface of the particles of pulverulent solid. It is believed that such dispersion, especially under optimum conditions, is in the form of a film on the surface of these particles though it is to be understood that it may be as droplets or small bodies of discontinuous liquid throughout the interstices of the pulverulent mass.

In order to initiate reaction a temperature consistent with the formation of sulphamic acid must be involved. When the reagents are brought together heat must be applied over and above normal temperatures either through the reactants themselves or to the reaction mixture in order that a temperature will obtain which is conducive to the formation of sulphamic acid. The reagents may be brought together at this temperature by preheating or by introducing them into a heated zone, or they may be premixed with cooling sufficient to inhibit the formation of sulphamic acid and the premix product heated to the desired temperature, processes of the latter method being taught in the co-assigned application Ser. No. 509,276. In any case sufficient heat must be supplied initially to cause the formation of sulphamic acid to proceed at a practical rate. It is satisfactory to maintain a temperature above about 150° F. for this purpose. At temperatures above about 150° F. the reaction is likely to be self-propagating unless the precautions previously set out are observed. Even when such conditions are observed inferior results are likely to be obtained in view of the temperatures becoming too high. In such case decomposition products such as ammonium bisulphate are likely to predominate. For practical purposes it is well to keep the temperature below about 250° F. By effecting suitable control of the temperature of the dispersed reaction component during the reaction I am enabled to avoid undesirable by-product formation and at the same time so to regulate the rate of the reaction that, coupled with the barriers against self-propagation, the reaction proceeds smoothly and simply without hazard of explosion or other difficulty. Thus in the processes of my invention it is desirable to maintain the temperature within the limits of about 150° F. to about 250° F. and to do it in such a way that any desired temperature within these limits may be maintained with reasonable degree of accuracy.

A particular advantage of my invention lies in the ease with which suitable temperature control may be effected when the sulphamic acid-forming reaction is carried out in a state of dispersion in or on the surface of a solid pulverulent diluent. In maintaining this solid pulverulent diluent in a suitable state of agitation in order to effect and maintain dispersion of the reaction component of the sulphamic acid-forming reaction on the surface of the particles of diluent, it is possible continuously to bring these individual particles in contact with a suitably cooled surface, as, for example, internally cooled mixer arms or water jacketed walls of a suitable mixer. In this manner the reaction component of the sulphamic acid-forming reaction is caused to film out over the surface of a temperature-controlled solid in a finely divided or pulverulent state and the temperature-controlled solid thus acts as a transfer medium for transferring the heat of the reaction from the reacting medium to the cooled surfaces and also as to reservoir to absorb heat of the reaction and prevent local overheating. The solid pulverulent diluent also acts as the heating means to bring the reaction component to a reactive temperature. It is of particular advantage in this respect in that it rapidly brings it to the desired temperature and keeps it there. In this manner I am able effectively to carry out the conversion to sulphamic acid without danger of self-propagation, local overheating or the disruptive effects of violent liberation of carbon dioxide.

The advantages of my invention are most fully obtained if the dispersion is so complete that the reaction mass remains apparently dry and pulverulent throughout the reaction. It is desirable therefore to effect the dispersion in a relatively large mass of pulverulent diluent, that is, relatively large as compared with the reaction component. It is desirable, by suitable mixing, to effect a uniform dispersion of the reaction component in the mass, that is to say, throughout any portion of the mass but not necessarily throughout the whole of the mass. It will be understood that if the reaction component is dispersed on the surface of a pulverulent diluent, that is, on the surface of the particles of that diluent, the dispersion inherently is uniform and the mass of diluent is inherently substantially greater than the mass of the reaction component. In the broader aspects of my invention, however, a lesser degree of dispersion is contemplated and is permissible so long as the limiting condition is observed that no substantial continuous body of liquid is present in the reaction mass.

It is already known that urea, sulphuric acid and sulphur trioxide combine with each other in equimolar quantities though, as previously noted, the art has not known how to make use of this knowledge apart from the wet processes. Thus 60 parts by weight of urea, 80 parts by weight of sulphur trioxide and 98 parts by weight of sulphuric acid are stoichiometric proportions for the production of 194 parts by weight of sulphamic acid with the evolution of 44 parts by weight of carbon dioxide. It is an important aspect of my invention that I am able to carry out the reaction substantially in these proportions, or, you might say, in proportions such that lutimately stoichiometric proportions are present together with such variations from the stoichiometric proportions as do not bring about the formation of a final product which is wet. If substantially stoichiometric proportions are employed under the conditions of my invention as explained above, the product obtained is not excessively wet.

It will be understood that sulphur trioxide may be dissolved in sulphuric acid to form oleum and that oleum may be used in the reaction, a "65 per cent oleum," for instance, containing 65 parts by weight of free sulphur trioxide dissolved in 35 parts by weight of 100 per cent sulphuric acid. When a 65 per cent oleum is used it is necessary, in order to have present stoichiometric proportions, to use sufficient free sulphuric acid to give a total sulphuric acid: sulphur trioxide weight ratio of 98:80. A 45 per cent oleum contains sulphur trioxide and sulphuric acid in approximately stoichiometric proportions for the purposes of the processes of our invention. A 45–60 per cent oleum is particularly suited to the formation of a dry product when used in the combining proportions with urea, i. e., mole for mole figured on the urea and the sulphuric acid. The excess sulphur trioxide does not interfere with the formation of a dry product for reasons to be pointed out hereinafter and in some cases is beneficial in accelerating the reaction.

In an illustrative embodiment of my invention sulphamic acid is produced from urea, sulphuric acid and sulphur trioxide by effecting contact between the reactants in the presence of a solid pulverulent diluent at a temperature of from about 150 to 250° F. under the limiting circumstance that the liquid component containing the sulphuric acid is maintained in such a state of dispersion that substantially no continuous body of liquid is present during the reaction. Within this limiting circumstance variation of the separate conditions such as rate of addition and intensity of mixing the reactants is possible. Thus, if the temperature in the mixing zone is held at about 150 to 250° F. and intensive mixing is provided, the reactants can be added to one another as relatively large increments, and it is not essential, though preferable, that the increments be in stoichiometric proportion at all times, provided that conditions of mixing are such that substantially no continuous body of liquid is present after contact of the reactants in the presence of the diluent. Conversely, if the temperature is similarly controlled and the reactants are added to one another as small stoichiometrically equivalent increments, and the amount of solid pulverulent diluent is large relative to the amounts of reactants, less intensive mixing ordinarily will be required to prevent the presence of a continuous body of liquid after contact of the reactants.

In order that the nature of my novel processes may be more clearly described, reference will be made hereinafter, by way of example, to specific embodiments of the processes, but it will be apparent that many variations and modifications may be made in the particular conditions set forth. The parts are by weight unless otherwise specified. Example I, which follows, illustrates a process of my invention in which urea, sulphur trioxide, and sulphuric acid are caused to react at a controlled temperature in the presence of a solid pulverulent diluent under mixing conditions such that the presence of a continuous body of liquid in the mixing zone is avoided.

*Example I*

Into a jacketed dough mixer equipped with sigma-shaped mixing arms there was placed 50 parts of a crude grade of dry, granular sulphamic acid, containing approximately 82 per cent sulphamic acid, 13 per cent ammonium bisulphate, and 5 per cent sulphuric acid, to act as a diluent for the reactants subsequently to be used. Urea, oleum, and sulphuric acid were then added simultaneously, but from separate sources, to the mixer, agitation of the mass in the mixer being provided by rotating the mixing arms. These additions were made as substantially stoichiometric equivalent increments, the rate of addition being 0.75 part of urea, 2.0 parts of 65 per cent oleum, and 0.5 part of 98 per cent sulphuric acid every 15 minutes over a period of five and one-quarter hours, and the addition of each increment being approximately continuous over the 15-minute period. The temperature of the reaction mixture was maintained in the range from 173 to 195° F. by passing cooling water at a suitable rate through the mixer jacket. The reaction mixture remained at all times a stirrable, free-flowing mass. After five and one-quarter hours the addition of reactants was stopped, there having been added a total of 15.75 parts of urea, 42 parts of 65 per cent oleum, and 10.5 parts of 98 per cent sulphuric acid. Agitation was continued for an additional three-quarters of an hour to insure complete reaction before the product was discharged from the mixer.

There was obtained 100 parts of a granular, free-flowing, light-colored product which was shown by analysis to have the approximate composition of the crude acid originally used as a diluent, namely, about 82 per cent sulphamic acid, 13 per cent ammonium bisulphate, and 5 per cent sulphuric acid. This crude product was purified by recrystallization from water, whereby its sulphamic acid content was raised to 98 per cent.

The foregoing example illustrates the application of a process of my invention as a batch operation. By a suitable choice of equipment and manner of adding the reactants the operation may be made continuous. In Example II, which simulates continuous operation with respect to the product in the reaction chamber, it is shown that the composition of the product does not vary substantially even though portions of the product are intermittently discharged and replaced by additional product formed by the reaction.

*Example II*

This example was carried out in the same equipment as used in Example I.

The proportions of urea and oleum used were calculated so as to give a 15 per cent excess of sulphur trioxide, in the form of oleum, over that required as stoichiometric equivalents. It was further assumed that one third of this excess would become hydrated by atmospheric moisture to form sulphuric acid, and a corresponding diminution of the amount of sulphuric acid added was accordingly calculated and used.

To a solid diluent, comprising 100 parts by weight of a crude grade of dry, granular sulphamic acid containing approximately 75 per cent sulphamic acid, 20 per cent ammonium bisulphate, and 5 per cent sulphuric acid, there was simultaneously added, over 15-minute intervals, 3.0 parts of urea, 1.92 parts of 98 per cent sulphuric acid, and 7.33 parts of 65 per cent oleum. Continuous, intensive mixing was provided and the mixture was held at about 200° F. by proper control of cooling water in the jacket of the reaction vessel. The reaction mixture remained at all times a dry, pulverulent, free-flowing mass. After one and one-quarter hours the addition of reactants was suspended, the product in the mixer was agitated for an additional one-quarter hour, and a portion of the product amounting to 50 parts by weight was discharged from the mixer. Addition of reactants was then resumed and continued for another one and one-quarter hour period. A further one-quarter hour of mixing was allowed, after which an additional 50 parts by weight of product was discharged from the mixer. This process was repeated for three more like periods.

The composition of the product discharged after the first reaction period was found to be approximately 74.2 per cent sulphamic acid, 23.3 per cent ammonium bisulphate, and 2.5 per cent sulphuric acid, while after the fifth reaction period the composition was approximately 77.0 per cent sulphamic acid, 16.4 per cent ammonium bisulphate, and 6.6 per cent sulphuric acid.

It will be seen from Example II that the sulphamic acid content of the product made according to a process of my invention is at least as high after a period of substantially continuous operation as it is after a single batch is produced. Hence the practicability of continuous operation is obvious.

In the following example there is illustrated the great potentiality of the invention for the continuous production of sulphamic acid on a large scale.

*Example III*

A heel of approximately 800–1000 lbs. of crude sulphamic acid was added to a 300 gallon Read Sigma Arm dough mixer equipped with a water jacket and hollow arms through which cold water was circulated for cooling. The heel was first heated by means of steam on the jacket to a temperature of not less than 167° F. Then urea and 58.0% oleum were fed simultaneously and continuously at rates of 18 lbs. of urea per 15 minutes and 58 lbs. of oleum per 15 minutes with 210,000 lbs. of water per 24 hours at 65° F. passing through the jacket and arms. The temperature of the reaction mass in the mixer was maintained at 220 to 240° F. The product was discharged from the mixer intermittently by opening the discharge gate at intervals and allowing the product to flow out. In 24 hours there was produced 5,600 lbs. crude sulfamic acid containing 81% $NH_2SO_3H$.

The following is illustrative of another type of process in which my invention is embodied and shows still greater potentialities of increased throughput.

*Example IV*

One hundred and seventy-one pounds of 54.5% oleum was charged in a premixer and there agitated and cooled by continuously circulating it through an internal cooler. Urea was gradually added in small increments while maintaining a temperature of about 100° F. until 40 pounds of urea was added. Thereafter urea and 54.5% oleum were added substantially in the proportions of one mole of urea for each mole of sulphuric acid at a rate of about 120 pounds total ingredients per hour. This product was introduced into a 20-gallon Read Sigma Arm dough mixer filled to about 10% of its capacity with crude sulphamic acid while maintaining a temperature of about 220° F. In a period of one hour during which periodic withdrawals were made as required, there was produced 180 pounds of sulphamic acid having an average analysis of 90.0% sulphamic acid, 9% ammonium bisulphate and 1% sulphuric acid.

While sulphamic acid products, such as that of Example II, containing ammonium bisulphate and sulphuric acid as impurities are suitable for many uses, it may be desired to remove these impurities so as to obtain substantially pure sulphamic acid. By such expedients as providing extremely intensive mixing of reactants and carefully dispersing the oleum and urea as they are added to each other in the presence of an inert diluent, I have found that the presence of impurities in sulphamic acid prepared by a process of my invention can be confined to a minimum. On a large scale, however, it may be preferable in some circumstances to carry out the processes under conditions which do not entirely avoid contamination of the product, and subsequently to purify the product by suitable methods.

Such purification can readily be accomplished by dissolving the impure product in water and recrystallizing it according to conventional practices. However, the solubility of sulphamic acid is not greatly increased with an increase in temperature; hence, the usual methods of crystallizing, involving cooling a concentrated solution to a reduced temperature, are not as effective as might be wished. I have found that the impurities ordinarily occurring in sulphamic acid can be effectively removed by alternately heating and cooling a slurry of the product in an amount of water insufficient completely to dissolve the sulphamic acid and thereafter removing the sulphamic acid as crystals from the resultant mother liquor containing the dissolved impurities. By such a procedure, not only are the impurities taken into solution without the necessity of completely dissolving the sulfamic acid, but also the size of the sulphamic acid crystals is increased so that the mother liquor can readily be drained or filtered off, whereas without the alternate heating and cooling steps, the fineness of the crystals would cause difficulties in such draining or filtering operations. Thus, by slurrying 100 parts by weight of the product of Example II in 100 parts of water and holding the slurry for one hour in a tank heated by suitable means in the center and cooled by suitable means around the outside, the impurities in the product were taken into solution while the sulphamic acid was, for the most part, left undissolved. The mother liquor so formed was readily removed by filtration and a dry sulphamic acid product was obtained having a purity of more than 98 per cent sulphamic acid.

While my novel processes for producing sulphamic acid have been described with particular relation to the foregoing examples, the particular conditions of these examples are susceptible to considerable variation and modification.

It is desirable to effect dispersion of the liquid components in a process of my invention by intensive mixing prior to or at the point of contact of the liquid with the other reactants and with the solid pulverulent diluent. The choice of methods for securing such a dispersion depends to some extent upon the form in which the reactants are added to the reaction zone. As already pointed out, the sulphur trioxide and sulphuric acid may be added together in the form of oleum of various strengths. Alternatively, these ingredients may be added separately as gaseous or liquid sulphur trioxide and concentrated sulphuric acid. Urea may be added in crystalline form or it may be fused and thus introduced into the reaction zone. Whatever may be the manner of adding the reactants, the particular mode employed preferably should be selected with a view to avoiding the presence of a continuous body of liquid after contact of all the reactants with each other and with the pulverulent diluent.

The apparatus used for mixing the reactants in a process of my invention preferably should be capable of maintaining the reaction mixture at all times as a substantially solid, free-flowing pulverulent mass with substantially no continuous liquid phase present after contact of the reactants with each other and with the diluent. For this purpose eequipment of the type commonly used for stirring dry or plastic materials conveniently may be used. The dough mixer shown in the foregoing examples is well suited to the task as are also such mixing devices as chaser or edge runner mills, pug mills, heavy duty ribbon blenders, scraping blade kettles of the Dopp type, and graining bowls. Other suitable mixing devices will be readily apparent to those skilled in the art.

In the processes of my invention the urea, sulphuric acid, and sulphur trioxide or their equivalents preferably are used in such proportions that substantially molecularly equivalent quantities are ultimately present; that is, for each mole of urea there is used one mole of sulphuric acid and one mole of sulphur trioxide. The proportion of sulphur trioxide used may be somewhat in excess of the calculated proportion theoretically required, since carbon dioxide is evolved during the reaction and a portion of the sulphur trioxide present may be carried off with this evolved carbon dioxide. Furthermore, a portion of the sulphur trioxide may become hydrated to sulphuric acid by moisture present in the reactants and in the atmosphere of the mixing zone. Thus, under the conditions of the foregoing Example II, a 15 per cent excess of sulphur trioxide was employed to advantage. In any event, the amounts of excess used should not be so great as to cause the reaction mixture to become pasty but little difficulty is encountered with any excess because sulphur trioxide is highly volatile at the temperatures of the reaction.

As has already been indicated above, the reactants may be simultaneously added to the reaction zone in substantially theoretical proportions. However, under some circumstances it may be preferable first to effect reaction between substantially stoichiometric proportions of sulphur trioxide and urea to form an intermediate product, urea monosulphonic acid, and this intermediate product may then be caused to react with stoichiometrically equivalent amounts of sulphuric acid at a temperature of from about 150 to 250° F. in the presence of a solid pulverulent diluent.

Alternatively, the urea may be added to the solid diluent, or indeed may itself function as a solid diluent, and the sulphur trioxide and sulphuric acid may be added increment-wise to this solid with suitable agitation.

The solid diluent used in the processes of my invention may be selected with a view to the purpose for which the sulphamic acid produced is intended. Thus, when a sulphamic acid product of the highest possible purity is desired, the solid diluent used should preferably be sulphamic acid which is as free as possible of contamination. On the other hand, if only a crude grade of sulphamic acid is required to be produced, the diluent may be a crude sulphamic acid. If the product is to be recrystallized or subjected to a washing action as above described, I may prefer to have ammonium bisulphate present in the diluent, the presence of this compound appearing to prevent or retard the formation of further amounts of ammonium bisulphate as an impurity. Moreover, if the presence of ammonium bisulphate in the reaction product is not objectionable, it may be used in the diluent whether or not a recrystallization or washing step is subsequently used. Similarly, if the product is to be used in conjunction with other materials, these other materials if suitable may be used as diluents. Thus, if the product is intended for use as a fire retardant, the solid diluent may be an inert material which is a suitable ingredient for fire retardants such as diammonium phosphate.

The amount of diluent will necessarily depend on the nature and type of mixing employed, but in any event the amount should be substantial relative to the amounts of liquid reactants present. It is usually preferable to use such an amount of diluent that the most effective use is made of the apparatus provided without exceeding the maximum allowable temperature for the reaction. As the product is formed it serves to act as the diluent, and hence during the course of the reaction the amount of diluent may be successively reduced as new product is formed. A weight of diluent equal to from about 10 to 20 times the weight of the reactants present is representative of the proportions which may be used satisfactorily, but it will be understood that these proportions are only indicative of a range and that observation of a few simple tests made under the conditions which it is proposed to use will readily permit one to determine a suitable proportion of diluent to reactants in a particular set of conditions.

The processes of my invention are particularly well adapted for use when the sulphamic acid product is to be converted to its salts since such conversion may often be advantageously carried out in the same apparatus as used in the manufacture of the acid. Thus, when it is desired to obtain ammonium sulphamate, ammonia gas may be admitted to the reaction chamber after the preparation of the acid has been completed as above described, and ammonium sulphamate may be produced in a dry way simply by continuing the agitation.

While I have shown certain specific processes in the foregoing disclosure, it will be understood that one skilled in the art may readily employ numerous processes without departing from the spirit of this invention.

I claim:

1. In a process for the manufacture of sulphamic acid from urea, sulphuric acid, and sulphur trioxide, the step of adding the components of the reaction, urea, sulphuric acid, and sulphur trioxide, at such relative rates while mixing with a solid pulverulent diluent that the urea and sulphuric acid are present in the reaction mass in substantially the molar proportions of 1:1 and the sulphur trioxide is present in a molar proportion to the other reacting components of not less than 1:1 and so that the reaction mass remains apparently dry and without the presence of any substantially continuous liquid phase.

2. In a process for producing sulphamic acid from urea, sulphuric acid, and sulphur trioxide, the steps comprising adding urea, sulphuric acid, and sulphur trioxide to a solid particulate diluent and agitating the solid particulate diluent during the addition, the rate of addition being such that the reaction mass remains apparently dry and particulate thruout the reaction.

3. In a process for producing sulphamic acid from urea, sulphuric acid, and sulphur trioxide, the steps comprising adding urea, sulphuric acid, and sulphur trioxide to a solid particulate sulphamic acid and agitating the sulphamic acid during the addition, the rate of addition being such that the reaction mass remains apparently dry and particulate thruout the reaction.

4. In a process for producing sulphamic acid from urea, sulphuric acid, and sulphur trioxide, the steps comprising adding urea, sulphuric acid, and sulphur trioxide to a solid particulate diluent maintained at a temperature of about 150–250° F. and agitating the solid particulate diluent during the addition, the rate of addition being such that the reaction mass remains apparently dry and particulate thruout the reaction.

5. In a process for producing sulphamic acid from urea, sulphuric acid, and sulphur trioxide, the steps comprising adding urea, sulphuric acid, and sulphur trioxide to a solid particulate sulphamic acid maintained at a temperature of about 150–250° F. and agitating the sulphamic acid during the addition, the rate of addition being such that the reaction mass remains apparently dry and particulate thruout the reaction.

6. In a process for producing sulphamic acid from urea, sulphuric acid, and sulphur trioxide, the steps comprising adding urea, sulphuric acid, and sulphur trioxide to a solid particulate diluent comprising sulphamic acid and ammonium bisulphate, the diluent being maintained at a temperature of about 150–250° F. and agitating the solid particulate diluent during the addition, the rate of addition being such that the reaction mass remains apparently dry and particulate thruout the reaction.

7. In a process for producing sulphamic acid from urea, sulphuric acid, and sulphur trioxide, the steps comprising adding urea, sulphuric acid, and sulphur trioxide substantially in the proportions of one mole of urea, one mole of sulphuric acid, and at least one mole of sulphur trioxide to a solid particulate sulphamic acid maintained at a temperature of about 150–250° F. and agitating the sulphamic acid during the addition, the rate of addition being such that the reaction mass remains apparently dry and particulate thruout the reaction.

8. In a process for producing sulphamic acid from urea, sulphuric acid, and sulphur trioxide, the steps comprising adding urea and 45 to 60% oleum to a solid particulate sulphamic acid maintained at a temperature of about 150–250° F. and agitating the sulphamic acid during the addition, the strength of the oleum and the proportions of oleum to urea being regulated to provide sulphur trioxide in excess of that required to combine with the urea and any water absorbed from the atmosphere while providing sulphuric acid in the reaction mass in substantially a mole for mole ratio with the urea and regulating the rate of addition so that the reaction mass remains apparently dry and particulate thruout the reaction.

ERNEST J. TAUCH.